Nov. 13, 1962 R. B. FULLER 3,063,521
TENSILE-INTEGRITY STRUCTURES
Filed Aug. 31, 1959 13 Sheets-Sheet 1

INVENTOR.
R. BUCKMINSTER FULLER
BY
*Pollard, Johnston, Smythe & Robertson*
ATTORNEYS.

Nov. 13, 1962 R. B. FULLER 3,063,521
TENSILE-INTEGRITY STRUCTURES
Filed Aug. 31, 1959 13 Sheets-Sheet 2

INVENTOR.
R. BUCKMINSTER FULLER
BY
*Pollard, Johnston, Smythe & Robertson*
ATTORNEYS.

Legend
——————— SILVER
——·——— BLACK
——————— ORANGE
———···——— PURPLE
------------ YELLOW

INVENTOR.
R. BUCKMINSTER FULLER

Nov. 13, 1962 R. B. FULLER 3,063,521
TENSILE-INTEGRITY STRUCTURES
Filed Aug. 31, 1959 13 Sheets-Sheet 4

Legend
SILVER
BLACK
ORANGE
PURPLE
YELLOW

INVENTOR.
R. BUCKMINSTER FULLER
BY
ATTORNEYS.

Nov. 13, 1962  R. B. FULLER  3,063,521
TENSILE-INTEGRITY STRUCTURES
Filed Aug. 31, 1959  13 Sheets-Sheet 7

INVENTOR.
R. BUCKMINSTER FULLER
BY
*Pollard, Johnston, Smythe & Robertson*
ATTORNEYS.

Nov. 13, 1962

R. B. FULLER 3,063,521

TENSILE-INTEGRITY STRUCTURES

Filed Aug. 31, 1959

INVENTOR.
R. BUCKMINSTER FULLER

BY

*Pollard, Johnston, Smythe & Robertson*
ATTORNEYS.

Nov. 13, 1962   R. B. FULLER   3,063,521
TENSILE-INTEGRITY STRUCTURES
Filed Aug. 31, 1959   13 Sheets-Sheet 9

INVENTOR.
R. BUCKMINSTER FULLER
BY
ATTORNEYS.

Nov. 13, 1962 R. B. FULLER 3,063,521
TENSILE-INTEGRITY STRUCTURES
Filed Aug. 31, 1959 13 Sheets-Sheet 10

INVENTOR.
R. BUCKMINSTER FULLER
BY
ATTORNEYS.

Nov. 13, 1962  R. B. FULLER  3,063,521
TENSILE-INTEGRITY STRUCTURES
Filed Aug. 31, 1959  13 Sheets-Sheet 11

INVENTOR.
R. BUCKMINSTER FULLER
BY
*Pollard, Johnston, Smythe & Robertson*
ATTORNEYS.

Nov. 13, 1962 R. B. FULLER 3,063,521
TENSILE-INTEGRITY STRUCTURES
Filed Aug. 31, 1959 13 Sheets-Sheet 13
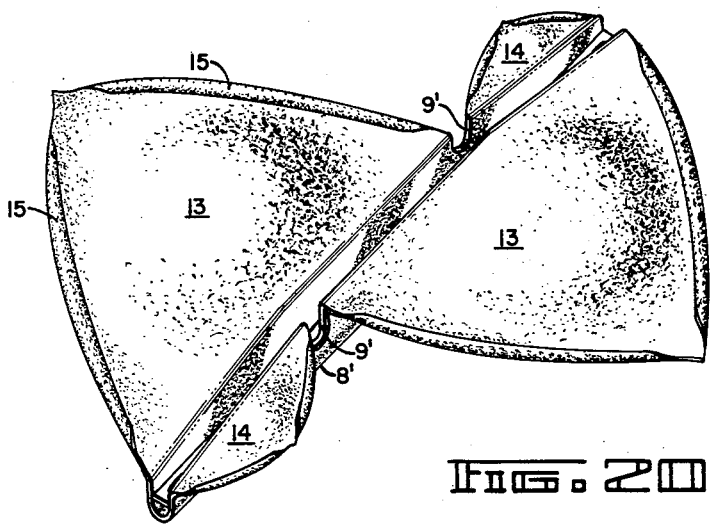
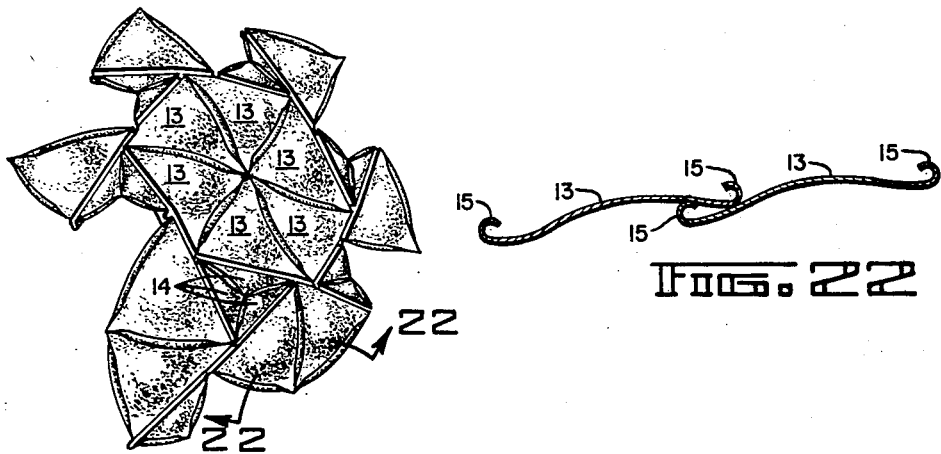
INVENTOR.
R. BUCKMINSTER FULLER
BY
Pollard, Johnston, Smythe & Robertson
ATTORNEYS.

United States Patent Office 3,063,521
Patented Nov. 13, 1962

3,063,521
TENSILE-INTEGRITY STRUCTURES
Richard Buckminster Fuller, 104—01 Metropolitan Ave.,
Forest Hills 75, N.Y.
Filed Aug. 31, 1959, Ser. No. 837,073
7 Claims. (Cl. 189—34)

The invention relates to a system of construction which utilizes the tensile properties of structural materials to the fullest advantage. It has special application to structures of vast proportions such as free-span domes capable of roofing a stadium or housing an entire village or city, and to mammoth air-flotable spheres as well as collapsible light weight structures adapted to be transported by rocket. In general, my invention is useful wherever it is advantageous to make the largest and strongest structure per pound of structural material employed. It is applicable also to geodesic structures such as described and claimed in my prior Patent No. 2,682,235.

SUMMARY

The essence of my invention consists in the discovery of how to progressively reduce the aspect of compression in a structure so that, to a greater extent than has been found possible before, the structure will have the aspect of continuous tension throughout and the compression will be subjugated so that the compression elements become small islands in a sea of tension. This is to bring the slenderness, lightness and strength of the suspension bridge cable into the realm previously dominated by the compression column concept of building. The suspension bridge is fundamentally a tensioned structure through its use of the catenary curve of the cables between compression column towers. My invention is akin to taking some of the compression out of the "compression towers," i.e. the columns, walls and roofs, of a building, or even taking compression out of a single column or mast through the creation of a structure having discontinuous compression (as hereinafter defined) and continuous tension and wherein the islands of compression in the mast are progressively reduced in individual size and total mass.

As applied to a geodesic dome structure, I might describe my invention as a structure of generally spherical form comprising discontinuous compression columns arranged in an overall pattern of three-column tepees, each column of each tepee being joined in "apparent" continuity to one column of one of three adjacent tepees to form what appears as a single column-like member, and the outer parts of the columns of each tepee being connected to one another only by tension elements. Tension elements also connect the outer parts of the columns to points on the columns in the region where they are joined together in apparent continuity.

As applied to structures generally, my invention consists in a structure comprising a plurality of discontinuous compression columns arranged in groups of three non-conjunctive columns connected by tension elements forming tension triangles, columns of adjacent groups being joined together in apparent continuity as above described.

According to another aspect of my invention the structure comprises an assemblage of tension and compression components arranged in a discontinuous compression system in which the compression components comprise an assemblage of compression and tension components arranged in a discontinuous compression system whereby the islands of compression in the initial discontinuous compression system are progressively diminished in size and relative mass.

Description

FIG. 1 shows the plan of a three-column tepee with connecting tension elements, called a three-strut octahedral tensile integrity unit, or "tensegrity."

FIG. 2 shows an assemblage of the three-strut tensegrities of FIG. 1. This view is analytical, for in the actual structure struts of adjacent tensegrities are integrally joined in "apparent" compressional continuity. This actual structure is shown in FIG. 3, which otherwise corresponds to FIG. 2, and shows the discontinuous compression structural complex.

FIG. 20 is a top perspective view of a further modified form of boom which includes surfacing elements for a geodesic dome.

FIG. 21 shows an assemblage of a number of identical booms of the form shown in FIG. 20.

FIG. 22 is an enlarged cross sectional view taken as indicated at 22—22 in FIG. 21.

Figure 1:
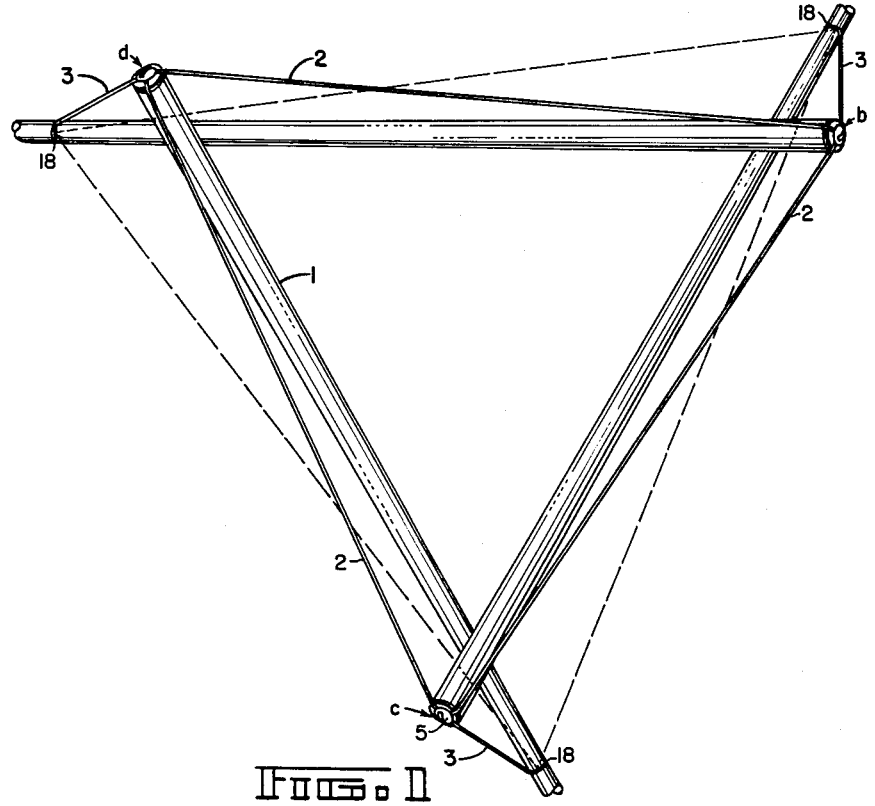
Figure 2:
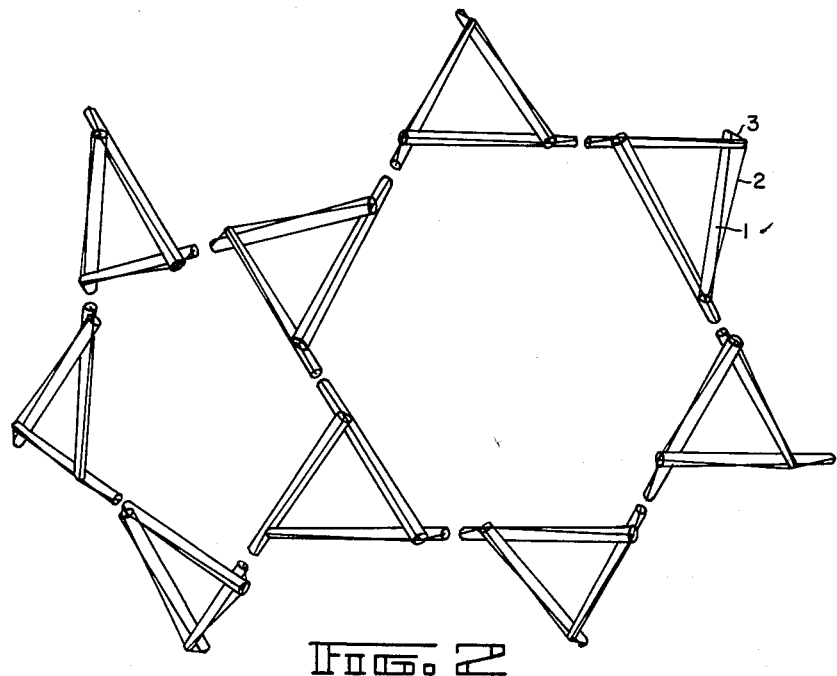
Figure 3:
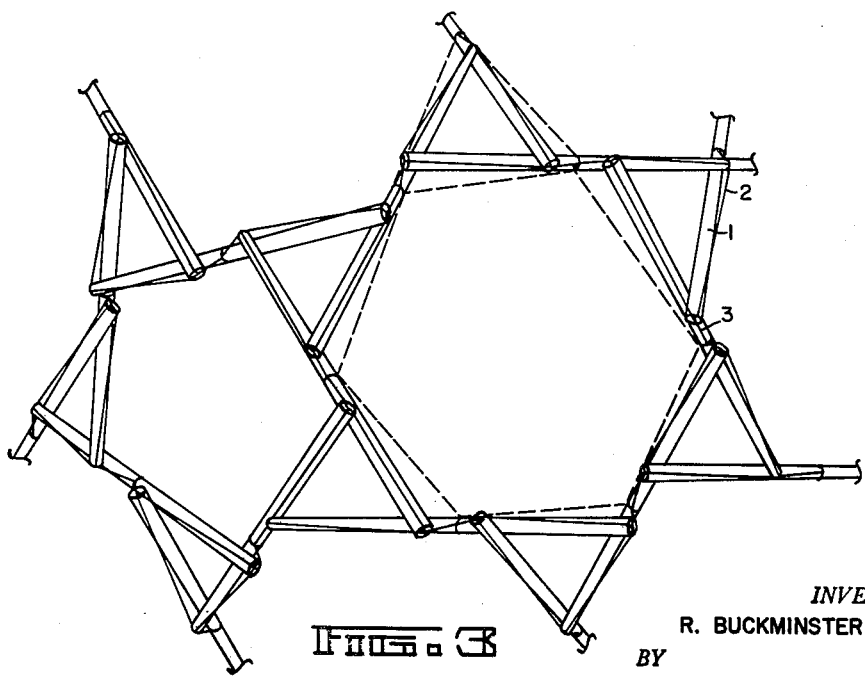

My tensegrity structure comprises a plurality of compression columns arranged in groups of three non-intersecting, or spaced, columns 1, crossed or overlapped to make a tripod as in an Indian tepee, FIG. 1, the columns of adjacent groups, FIG. 2, being integrally joined together, FIG. 3. FIGS. 1 and 2 are analytical, FIG. 3 showing the actual structure. FIG. 1 illustrates diagrammatically the cohering principle of the primary system as one component of my unique tensile integrity complex. This primary system, a three-strut tensile integrity unit, is termed a "tensegrity." It will be observed from FIG. 1 that this primary system displays the six vertexes which are characteristic of the octahedron, a polyhedron having three axii, six vertexes, eight faces and twelve edges. In a spherical system made up of such primary octahedral tensegrities it becomes possible to omit tension wires which if present would lie along six of the twelve edges of each octahedron. The omission of such wires tends to obscure the visual appearance of the eight triangular faces of the octahedron, but does not destroy the octahedral aspect of the primary system that is necessarily fixed and predetermined by the presence in the system of the aforesaid six vertexes which characterize the octahedron. Columns 1 are connected by tension elements such as wires or cables 2 forming a tension triangle a—b—c—, and tension elements 3 connect the vertexes a, b. c of the tension triangle to points 18 on the columns 1 in the region where they are joined to the columns of adjacent tensegrities. The dotted lines outlining the base of the tripod in FIG. 1 are theoretical and do not necessarily exist in the actual structure. If these dotted lines are considered to represent tension wires we have a complete primary octahedral tensegrity system in which the compression columns 1 are separated from one another by the tension elements 2 and 3. Tension elements 2 and 3 extend throughout the structure in a continuous network, whereas columns 1, being separated from one another, do not make a continuous network and may be described as compression columns arranged discontinuously, hence "discontinuous compression columns." Another aspect of discontinuous compression is found within a single column and will be understood from FIG. 3: the tension forces in wires 3, when resolved, have components 17, 17 acting in opposite directions. Thus the right-hand end of column 1 as viewed in FIG. 3 acts functionally as one compression column and the left-hand end acts as another compression column. Thus, if we disregard bending forces, the compression forces can approach theoretical zero at the point 18 in the column where the tension elements 3 are attached to it. This results in a separation of the compression forces in the two ends of the column. Because of this separation of the compression forces, we have again what may be described as "discontinuous compression," this time within a single column. Yet, because the two ends of the column are parts of one integral member, it appears as though there is just one compression member. Inasmuch as the foregoing analysis of the compression forces has revealed that there are really two separate compression columns within the one integral member, it seems helpful to think of the columns of the adjacent groups, FIG. 2, as being joined together, FIG. 3, in "apparent" continuity, for although the continuity in a structural sense is real, in respect of functions in compression it is not real. Hence the compression columns are said to be joined together in "apparent continuity." And because the tension network is continuous throughout the structure, whereas the columns are separated from one another and are supported so as to float in the network of tension wires, it has seemed appropriate to characterize the structure further as comprising compression elements which are like "islands" of compression in a "sea" of tension elements. If desired, the structure may contain tension wires as represented by the dotted lines in FIGS. 1 and 3. Such wires when used will relieve the columns of bending stresses and complete the interior tensional integrity of the octahedral system. The compression members are said to be discontinuous, because no force of compression is transmitted from one to the other as they float in a sea of tension elements. Their positions are fixed by the octa system of the unit, although they have a turbining tendency as we shall see later. In the discontinuous compression assembly of FIG. 3, termed a complex of the primary three-strut tensegrities, or a "complex tensegrity," the imaginary wires represented by the dotted lines in FIG. 1 are made unnecessary because of the arrangement of the primary tensegrities in a spherical system.

In our consideration of the complex tensegrity of FIG. 3, it will be observed that the terminal junctures of the several primary tensegrities are all in alignment, i.e. 180° junctures, and are apparently compressionally continuous by reason of the fact that each pair of columns 1 integrally joined together, appear as a single column-like member. Because of this seeming continuity of compression from one primary tensegrity to another and because the central coherence of the primary tensegrities is visibly discontinuous by reason of omission of the tension elements shown by the dotted lines in FIGS. 1 and 3, the complex tensegrity presents a visibly deceptive appearance to the unwary observer in which the joined tripod legs of adjacent units appear as single units and, as such, appear to be the primary "elements" of the complex tensegrity, whereas, we have learned from our analysis of FIG. 1 and its relation to FIGS. 2 and 3 that our elements are the three-strut octahedrons and that the cohering principle of the simplest elements is tensegrity. Notice that because the tension elements 3 connect the vertexes of the tension triangle to points on the struts 1 in the region where they are joined together, a continuity of tension is created from end to end of each compression element by the tension elements 2 and 3.

Figure 4:
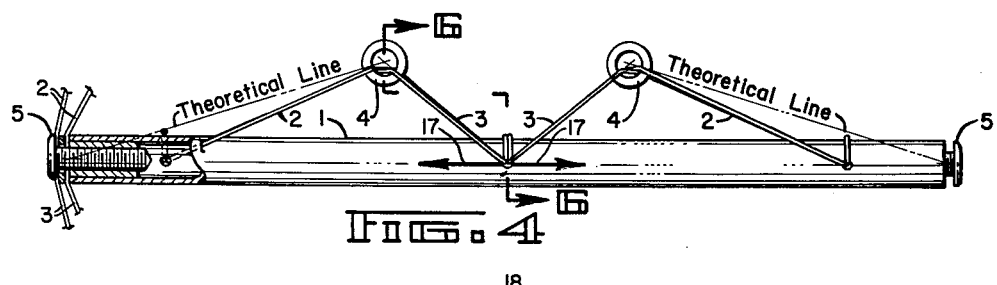
FIG. 4 is a side elevational view of the strut and tension sling component of the discontinuous compression structural complex of FIG. 3, called a "boom."
Figure 5:
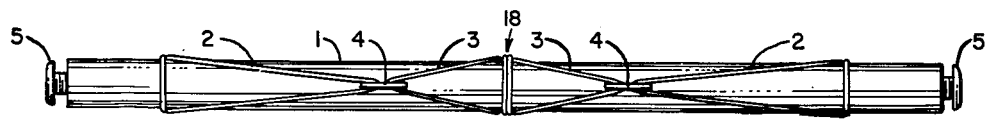
FIG. 5 is a plan view of the boom of FIG. 4.
Figure 6:
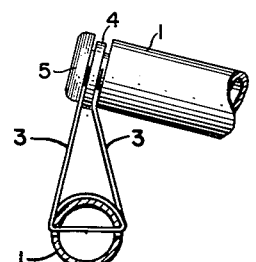
FIG. 6 is a sectional view taken on line 6—6 of FIG. 4.

In the integrated struts or columns of adjacent tensegrity units we have the prefabricated component of my structure shown in FIG. 4, termed a boom, which in combination with the tension elements 2 and 3, emerges as a characteristic form which I call a "B-boom" owing to its configural resemblance to the latter B. This boom is functionally an element of two adjacent primary tensegrities by reason of the separation of the compression forces in the manner already described. In the particular embodiment of the B-boom shown in FIGS. 4–6, the compression column takes the form of a tubular strut such as a tube of aluminum or steel, drilled to receive the wire lacings of the tension slings 2, 3, and having a Roule plug 16 in each end to receive a threaded fastening 5. Washers 4 at predetermined apexes of the sling triangles are adapted to receive the fastening at the ends of mating booms. If there is slack in the system it can be taken up by additional washers at the ends of the tube. The wire slings can be double as shown, or single. The mating booms are secured together by inserting one of the fastenings 5 of one boom through one of the washers 4 of the other as shown in FIGS. 1 and 4.

As an example to illustrate the best mode contemplated by me for carrying out my invention I shall describe the construction of a 270-boom tensegrity geodesic sphere based upon a six-frequency subdivision of an icosahedron. This sphere will be constructed of five different boom components. The design factors for the booms are given in FIG. 7. Dimensions A—A, B—C, etc. are for the theoretical lines designated in FIG. 4. The length of all booms will be such as to subtend an angle of 25° 14′ 30″ of the sphere and will of course vary according to the size of the sphere to be constructed. This length will be determined by simple trigonometric calculation in each case. Given the size of the sphere to be constructed, the factors shown in the diagrams are used as multipliers for direct calculation of the dimensions of the wire slings of the five boom components. Altitude factors are multiplied by the radius of the desired sphere, chord factors by the diameter.

Figure 8:
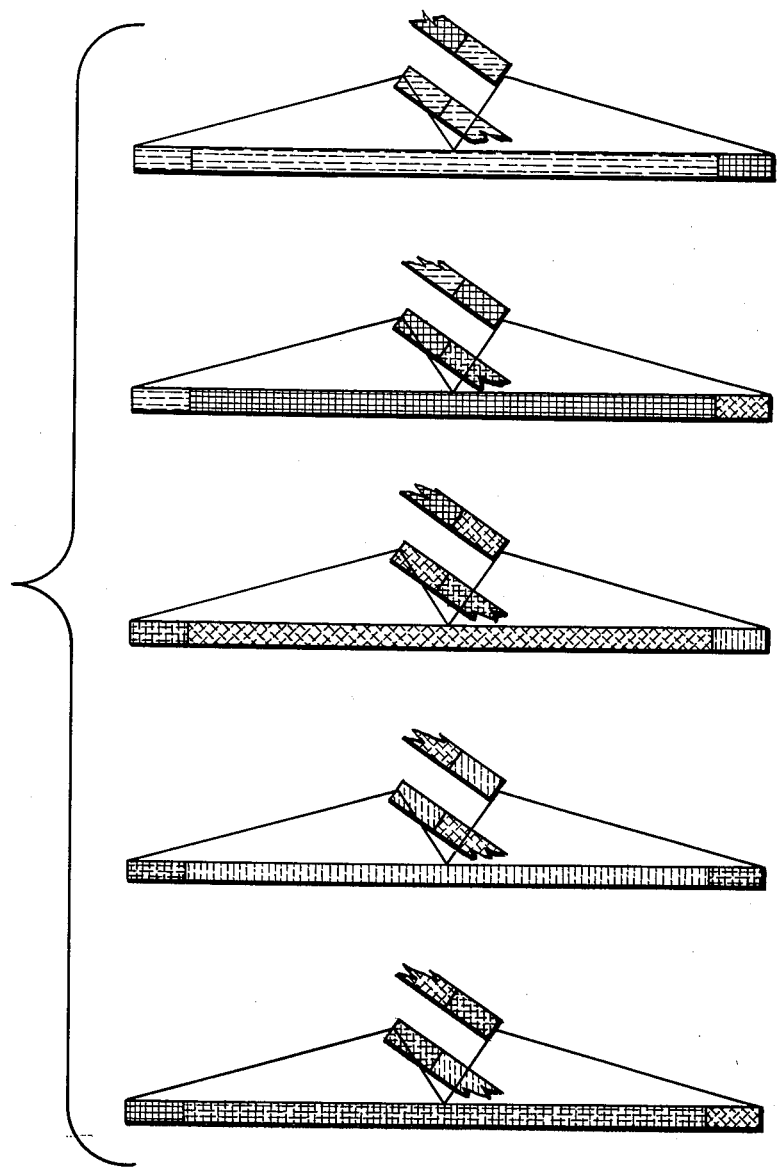
FIG. 8 is a color code for assembling the booms of FIG. 7 according to one embodiment of my invention.
Figure 9:
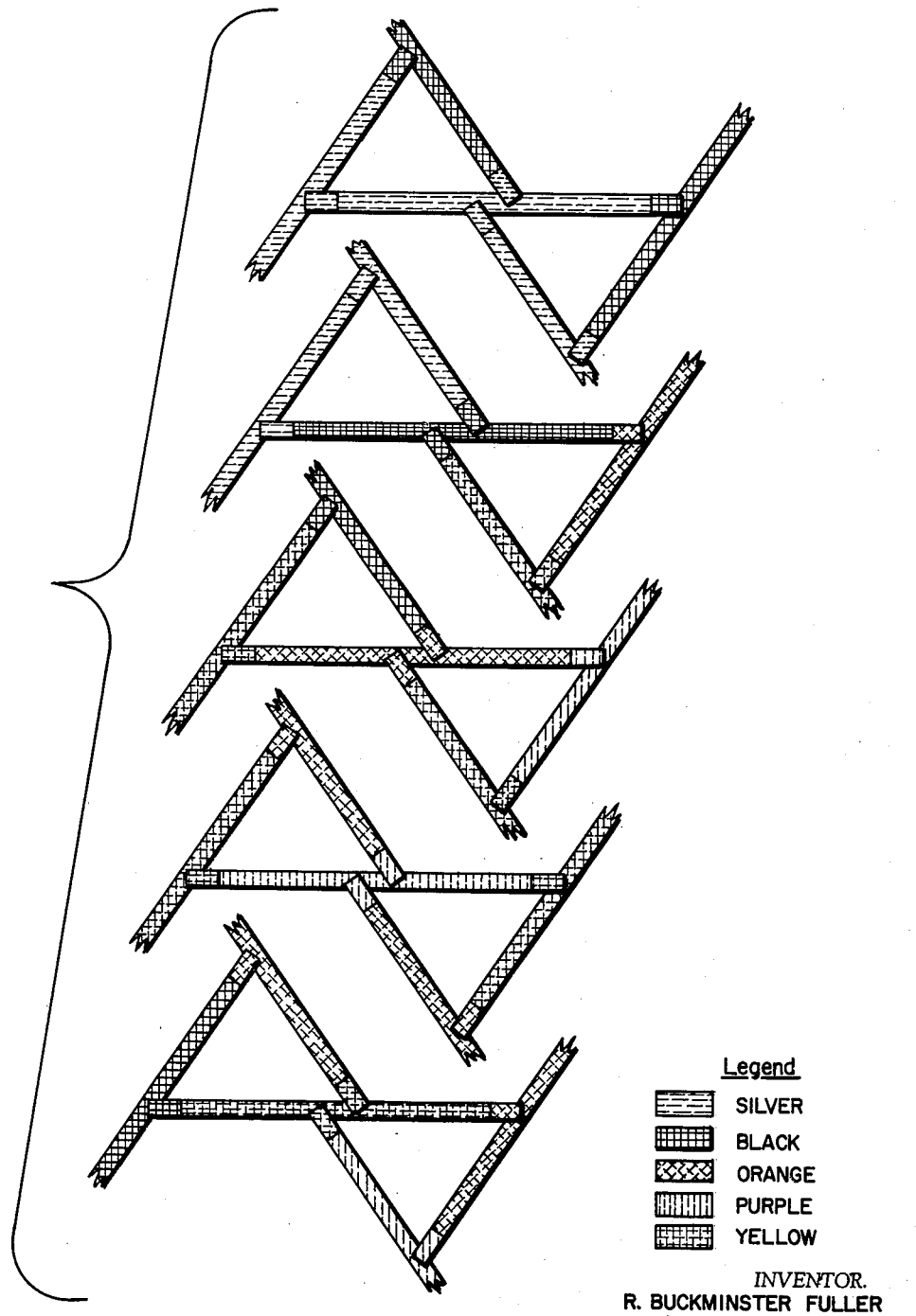
FIG. 9 is a further color code for assembling the booms.
Figure 10:
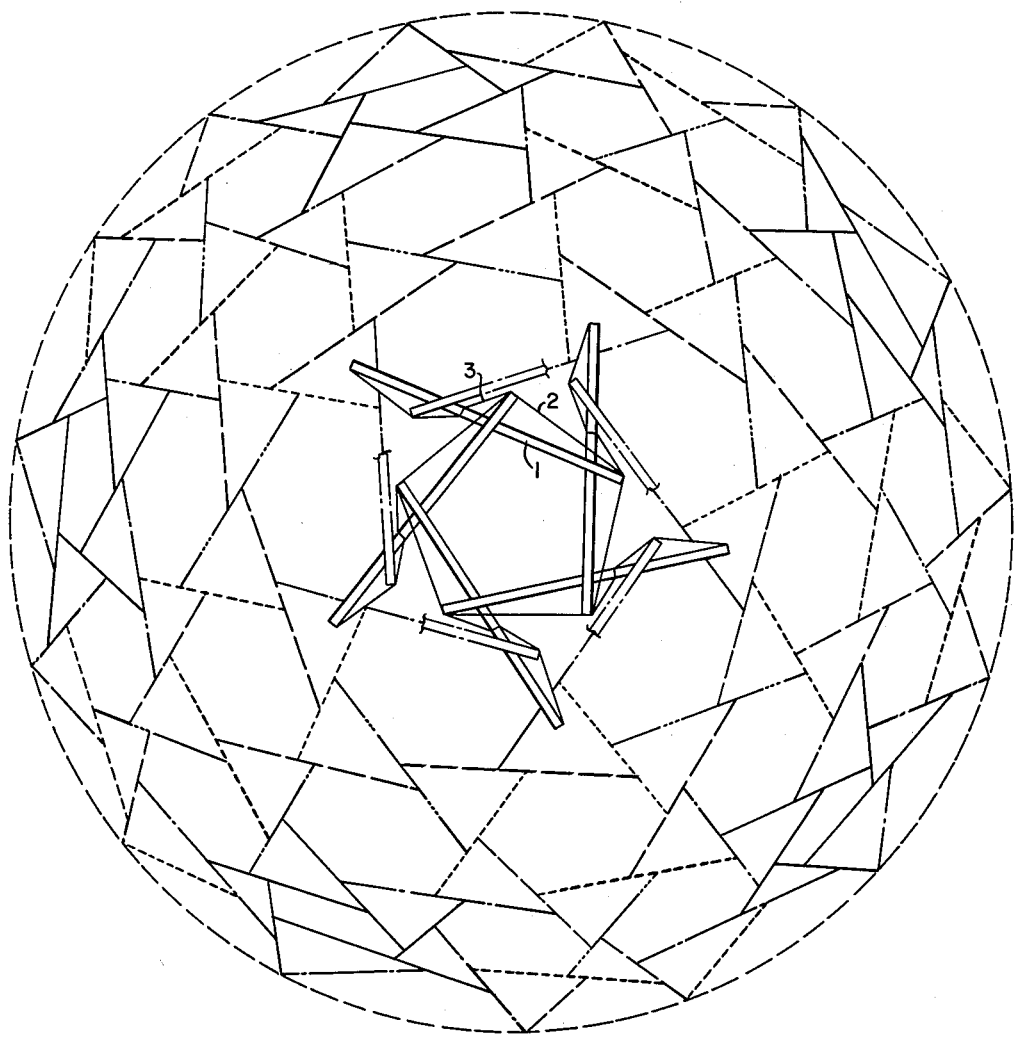
FIG. 10 is a plan view of a 270-strut tensegrity obtained by following the color code of FIGS. 8 and 9.
Figure 11:
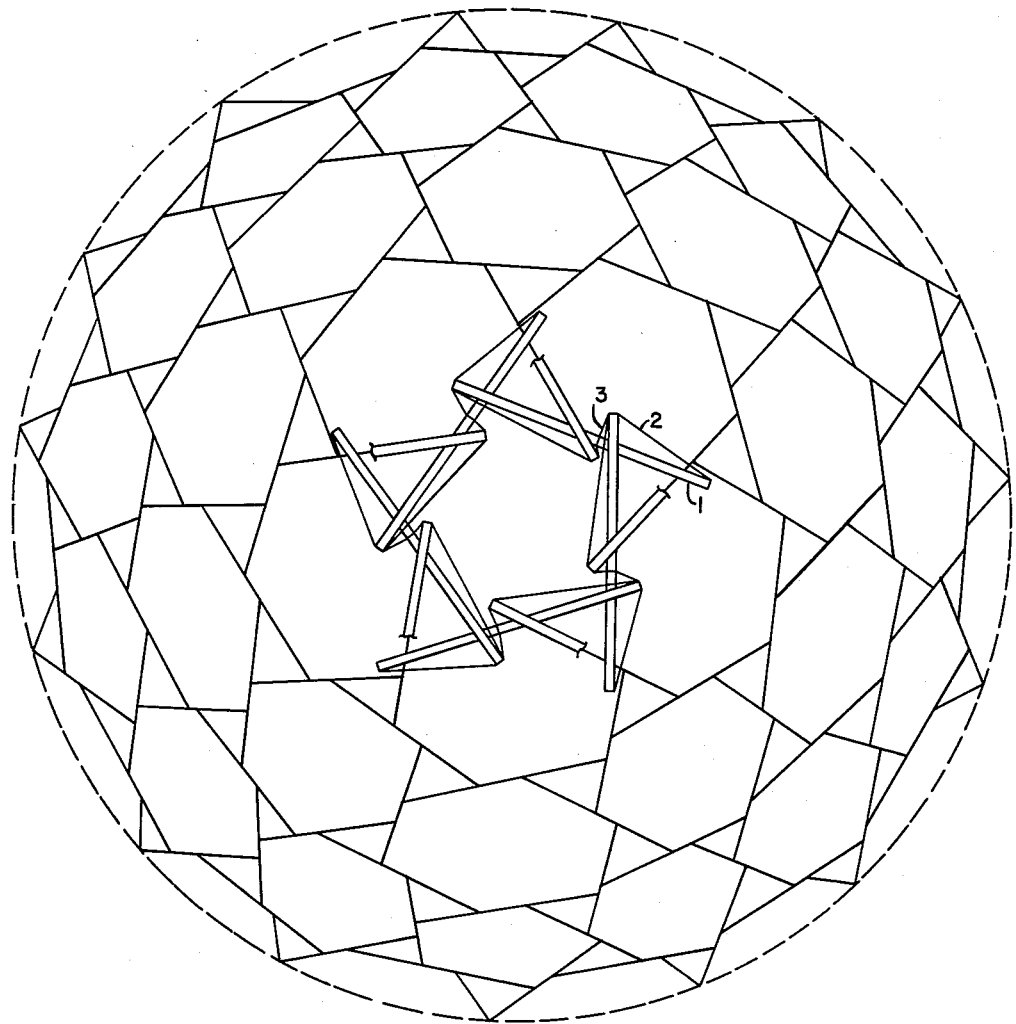
FIG. 11 is a plan view of a 270-strut isotropic tensegrity obtained by assembling booms which are all of exactly the same design.
Figure 12:
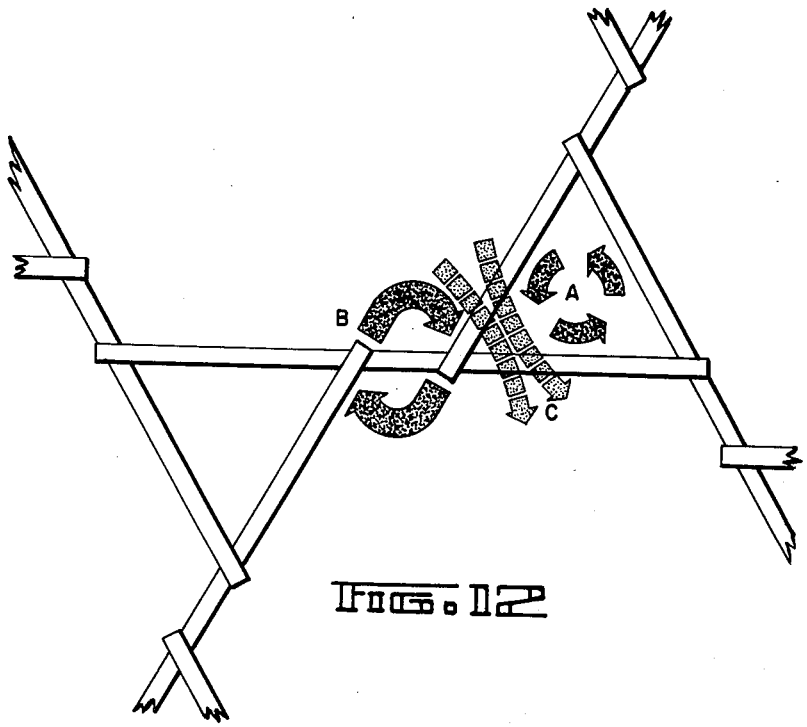
FIG. 12 is a diagram to explain the turbining tendencies of the thrusts of the boom ends in the tensegrity of FIG. 11, known as a "single bonded" tensegrity.
Figure 13:
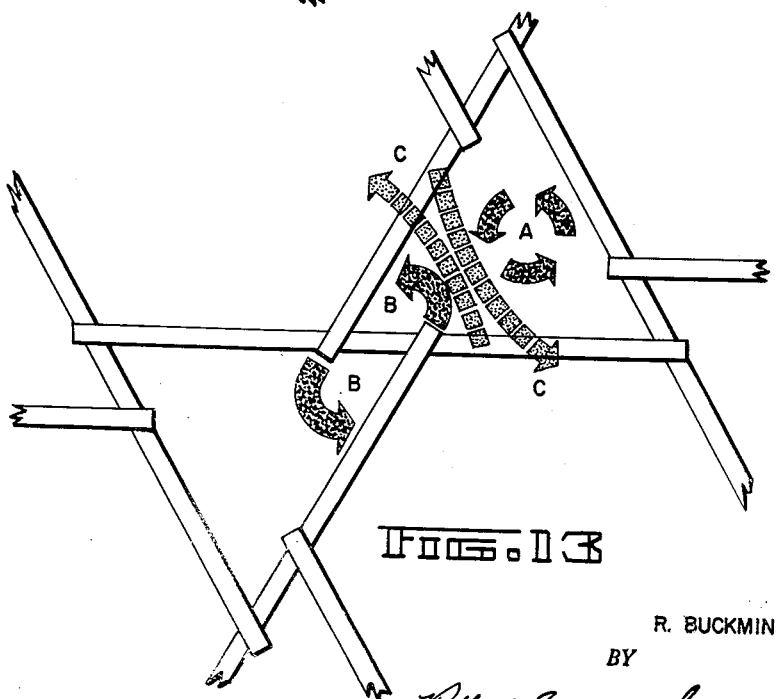
FIG. 13 is a diagram to explain the turbining tendencies of the thrusts of the boom ends in the tensegrity of FIG. 10, known as a "double bonded" tensegrity.

The several boom components may then be colored according to the code given in FIG. 8, following which the manner of assembling them becomes merely a matter of matching colors. FIG. 10 also shows the manner of assembling the booms, in this case through identification of the several designs of boom components by a code consisting of solid and broken lines. The geodesic sphere tensegrity of FIG. 10 is known as a double bonded turbo triangles complex tensegrity (six frequency). "Double bonded" denotes the overlapping triangles of FIG. 10. FIG. 11 shows another embodiment of my invention also comprised of a 270-boom sphere known as a single bonded turbo triangles complex tensegrity. "Single bonded" denotes the non-overlapping triangles of this view. Comparing FIGS. 10 and 11 it will be noticed that in the single bonded construction the triangles are spaced apart whereas in the double bonded construction they overlap. Where the triangles are spaced apart (FIG. 11) it will be seen that a point of attachment 18 (FIG. 1) of the tension elements 3 to the central portion of the column-like member 1 lies between the spaced triangles; and where the triangles overlap (FIG. 10) said point of attachment lies within the overlap. The significance of the difference between the single and double bonded constructions will be explained with reference to FIGS. 12 and 13 which are diagrams of the respective constructions. In both constructions the axes of the struts of each group of three are in spaced overlapping relation such that the axial thrusts of the struts at the points where they are connected by the tension triangle elements will be additive to produce turbining forces tending to rotate the tension triangle. In the specific embodiments shown in FIGS. 12 and 13 this turbining tendency is counterclockwise as indicated by the arrows A. In the single bonded tensegrity, FIG. 12, the corners of adjacent tension triangles are spaced apart whereby the thrusts of adjacent discontinuous struts of adjacent tension triangles will be additive to produce turbining forces B additive to those tending to rotate the triangle as indicated at C. In the double bonded tensegrity, FIG. 13, the corners of adjacent tension triangles are overlapped whereby the thrusts of adjacent discontinuous struts of adjacent tension triangles will be additive to produce turbining forces B opposed to those tending to rotate the tension triangle.

Figure 14:
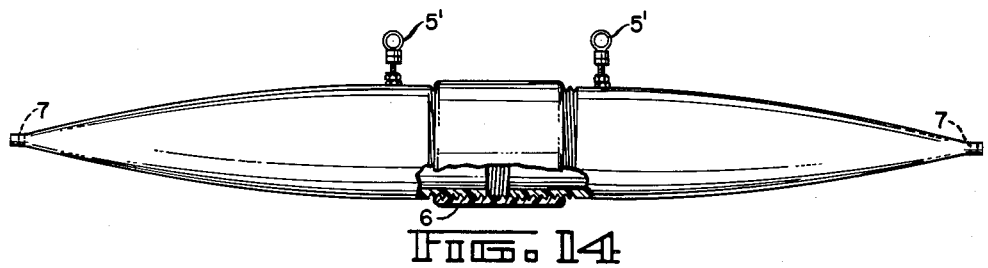
FIG. 14 shows a modified form of strut, or boom.

FIG. 14 illustrates a modified form of boom having a relatively wide girth at its center and tapered ends. Adjustable tie down sockets or dead eyes 5' provide means at one side and centrally of the broom for tensionally securing it to the ends of other booms of like construction. The boom may be made in two parts threaded into the connecting sleeve 6, furnishing means for adjusting the length of the boom. Holes 7 at the boom ends provide means for tying in to the dead eyes 5' of adjacent booms.

Figure 15:
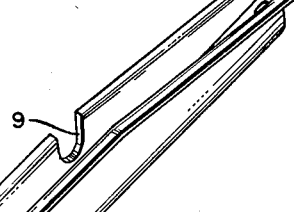
FIG. 15 is a perspective view of another modified form of boom.
Figure 16:
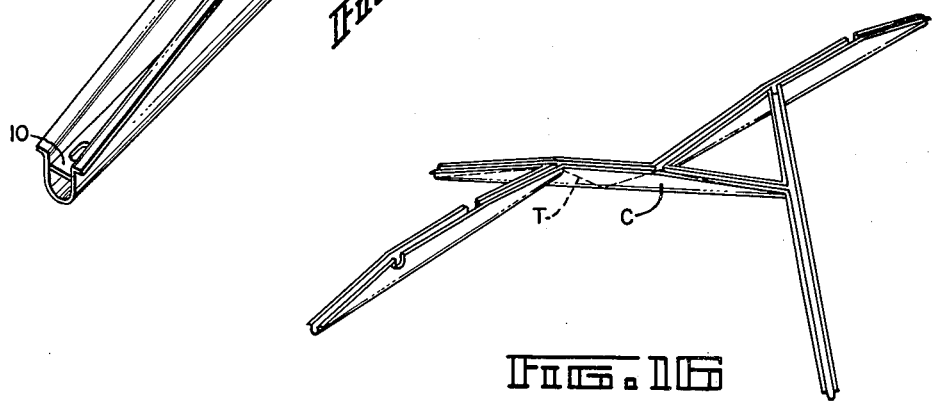
FIG. 16 is a perspective view showing how the booms of FIG. 15 are interconnected in a tensegrity complex.

FIG. 15 shows another form of boom consisting of a trough-shaped member whose base 8 forms a compression column. Elevated central portions of the edges of the trough shaped member are formed with recesses 9 to receive the ends of the troughs of booms of like construction as in FIG. 16, and provide means for tensionally connecting the several booms in creating the primary and complex tensegrities I have described. Here the base of the boom forms the compression column and its upper edges form the tension triangles and the tension elements connecting the vertexes of the tension triangles to points on the columns in the region where the columns of adjacent groups are joined together in apparent continuity, i.e. centrally of the booms. The functional equivalence of the trough boom to the strut and sling boom of FIGS. 4–6 becomes apparent when the tensional stresses are resolved as indicated by the dotted lines T in FIG. 16 and the base of the trough is regarded as an apparently continuous compression strut C forming parts of two adjacent primary tensegrity tripods. Again the tension and compression aspects emerge in the characteristic form I have called a "B-boom." The booms may be trussed interiorly by perforated metal strips 10 welded or otherwise secured to the sides of the trough.

Figure 17:
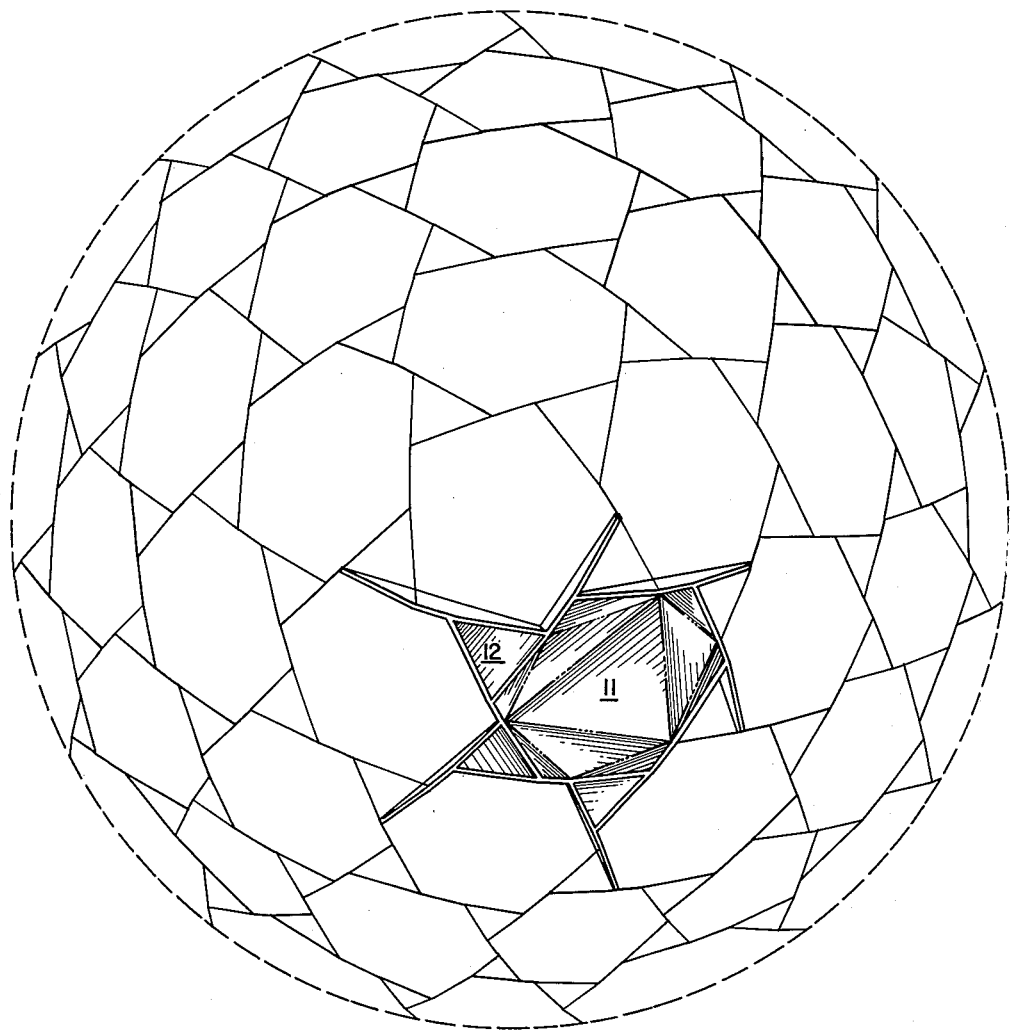
FIG. 17 is a plan view of a 270-strut geodesic sphere tensegrity utilizing the complex of FIG. 16.

FIG. 17 shows a 270-strut geodesic sphere tensegrity with single bonded positively turbining triangles constructed from the trough or gutter booms of FIG. 15. The triangles, hexagons and pentagons of the tensegrity complex may be covered with any suitable plastic or metal skin such as the flanged metal pans shown at 11, 12. The triangular pans may be flat. The hexagonal and pentagonal pans may be made of flat sheets bent to suit the form of the hex and pent surfaces as shown. A complete watershed is afforded by this construction, each gutter boom draining into the center of an adjacent boom, the booms forming a spidery pattern of eaves troughs for the surfacing skins.

Figure 18:
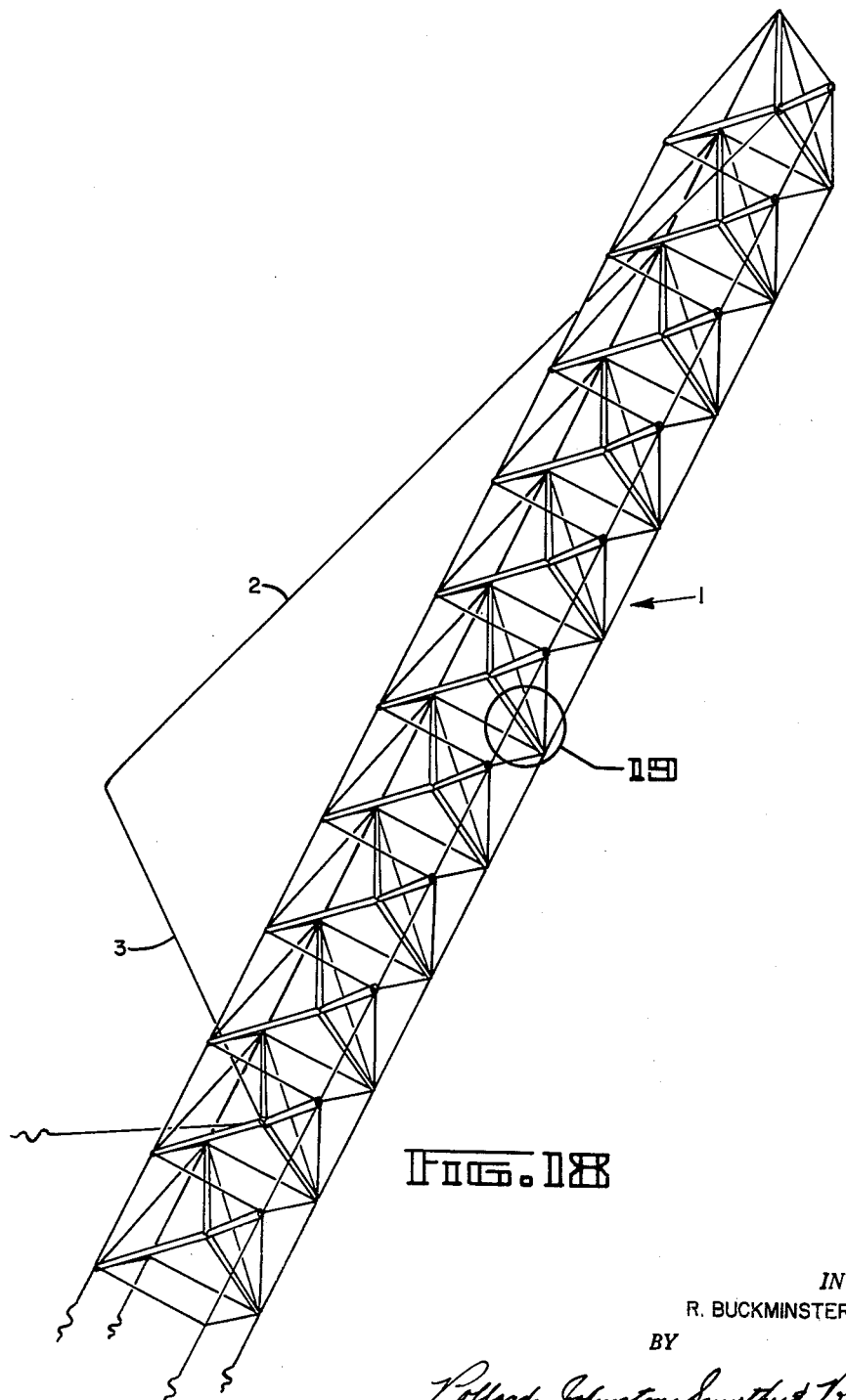
FIG. 18 is an isometric view of a discontinuous compression column which can be used to replace the compression strut of the component shown in FIG. 4.
Figure 19:
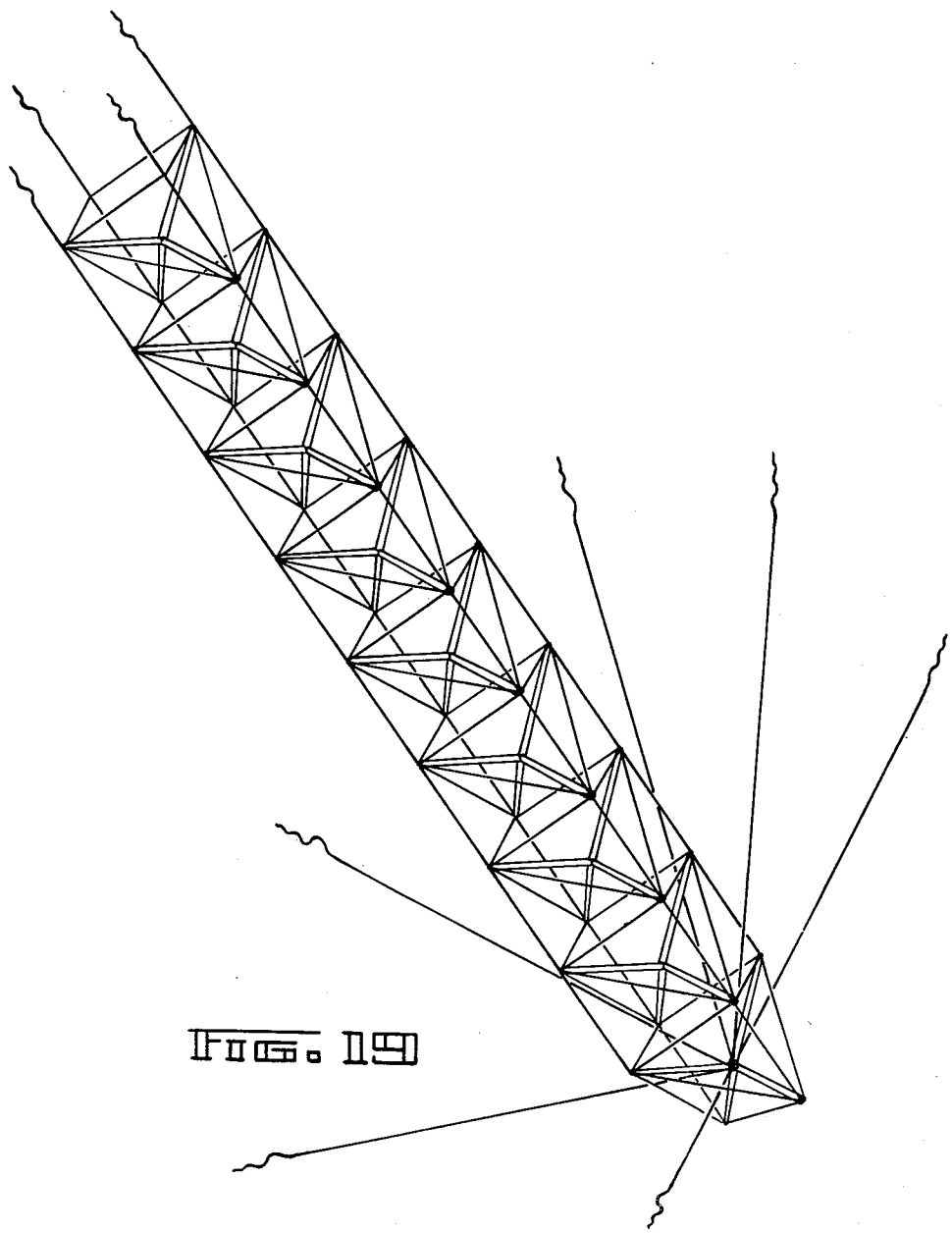
FIG. 19 is an enlargement of a portion of FIG. 18 showing a single strut made as a discontinuous compression column according to what may be imagined as a reduced scale version of FIG. 18. The area of FIG. 18 covered by FIG. 19 is that indicated at 19 on FIG. 18.

FIG. 18 shows a discontinuous compression structure in which the double lines represent compression struts and the single lines represent tension elements. If desired, the compression columns or struts 1 of the primary and complex tensegrities of FIGS. 1–3 may be replaced by discontinuous compression struts made according to FIG. 18. There results a structure comprising an assemblage of tension and compression components 1, 2 and 3 arranged in a discontinuous compression system in which the compression components 1 themselves comprise an assemblage of compression and tension components arranged in the discontinuous compression system of FIG. 18 whereby the islands of compression (1) in the initial discontinuous compression system are progressively diminished. The diminished islands of compression represented by the struts shown in double lines in FIG. 18 may in turn be replaced by discontinuous compression struts made according to what may be imagined as a reduced scale version of FIG. 18, with the result shown in FIG. 19 which is an enlargement of a portion of FIG. 18.

Because of discontinuous compressions in my tensegrity complex, local tensions in the system can be tautened or released so as to permit a tensegrity sphere to be folded up for transport by plane, helicopter or rocket. Upon automatic release of tautened tensions and taking up of slack in released tensions for restoration of the original tension forces, the sphere (or dome) remembers its original shape and will resume it, thus providing a self-erecting structure.

With reference to FIGS. 20–22, I shall now describe another embodiment of my invention in which the booms also include surfacing elements for a geodesic dome. This boom may comprise a trough-shaped member similar to the boom shown in FIG. 15 whose base 8' forms a compression column and whose upper edges are designed to be stressed in tension. Weirs or recesses 9' are adapted to receive the ends of the troughs of booms of like construction. A pair of generally triangular sheets 13, 14 extend laterally from each edge of the trough, forming a large triangle 13 and a small triangle 14 at each side of the boom. The large triangles are at opposite ends of the boom. The same is true of the small triangles. By reason of this peculiar arrangement, an assemblage of like components to form a geodesic tensile tensegrity, FIG. 21, finds five or six large triangles 13 mating to form the surface of a pentagon or hexagon as the case may be (see the pentagons and hexagons of the tensegrity of FIG. 11), and three small triangles 14 mating to form the surface of the triangles of the tensegrity. The edges of the triangles preferably are curled into a trough-like form as at 15 to assist in forming a watershed. Also, the triangles are preferably curved into petal-like form as shown to gain an overlapping iris pattern and to accommodate the surfacing elements to the form of the tensile part of the boom with its sloping ends.

Figure 7:
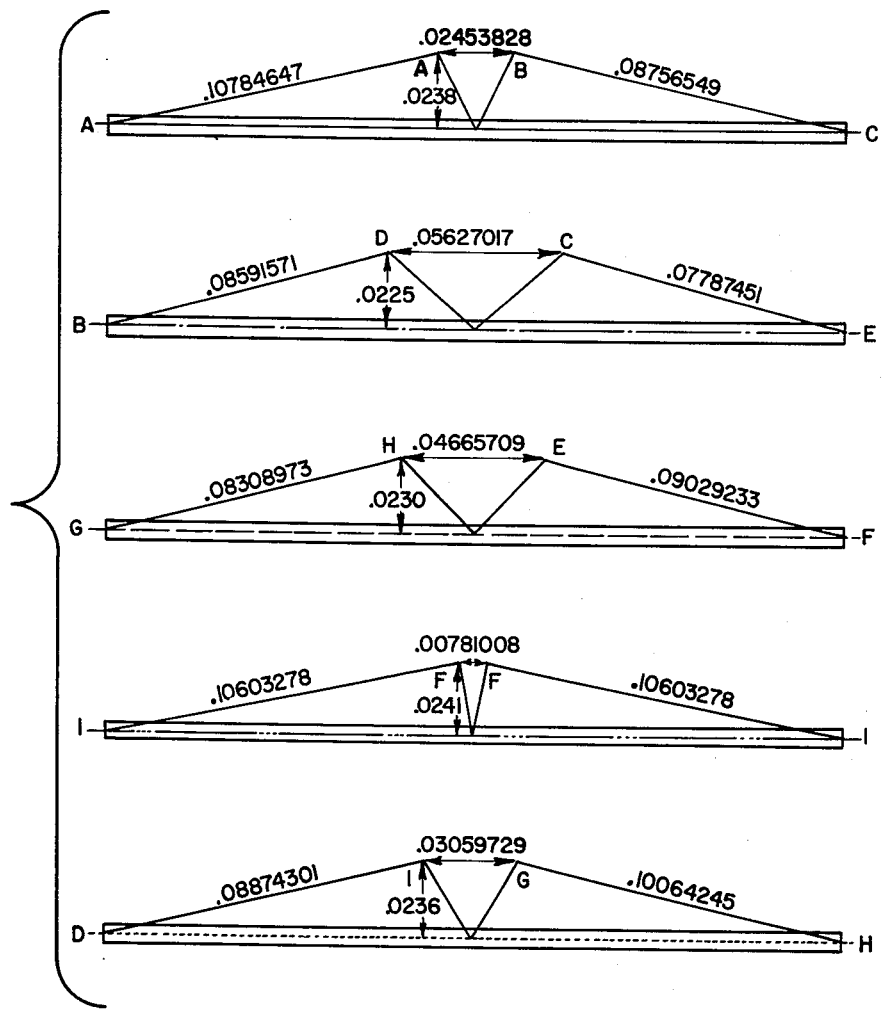
FIG. 7 is a boom dimension schedule for a 270-boom tensegrity sphere.

It will be remembered that in describing the design of a 270-boom tensegrity geodesic sphere with reference to the design factors given in FIG. 7, it was disclosed that the length of all booms will be such as to subtend an angle of 25°14′30″ of the sphere. Thus the five different boom components of FIG. 7 all utilize one common length of strut, so the 270-strut tensegrity of FIG. 10 is entirely constructed from boom components utilizing this one standard-length strut. I have found that this simplification can be carried one step further by constructing the 270-strut tensegrities of either FIG. 10 or FIG. 11 from one unique B-boom consisting of a standard-length strut and a standard form of tension sling. For example, I have constructed the double-bonded tensegrity of FIG. 10 entirely from one such unique B-boom design which will now be described in terms of its principal dimensions. The length of the boom, as before, will be such as to subtend an angle of 25°14′30″ of the desired sphere. Referring to the boom at the top of FIG. 7, the factors for designing the unique boom become:

A—A _____ .187
A—B _____ .066
B—C _____ .187
Altitude _____ .024

Given the size of the sphere to be constructed, these factors are used as multipliers for direct calculation of the dimensions of the wire sling of the one unique boom component. The factors are simply multiplied by the radius of the desired sphere.

According to this further simplification, one unique B-boom alone implements any given size of spherical structure of visibly negligible radial variations in surface sphericity and of any frequency modular multiplication of self-divisioning to beyond billionfolds. Here emerges a surprising and significant attribute of my tensegrity sphere, for past concepts of identical subdivisioning of a sphere have suggested that the upper limit of such subdivisioning is sixty identical components or one hundred and twenty components comprising sixty positive and sixty negative ("mirror image") components. Tensegrity according to my present invention now permits spherical structuring in any size and in any frequency of subdivisioning in both single and multiple layer trussing with the use of only one unique boom component. Heretofore such uniformity could be enjoyed only in rectilinear structures for it had seemed that spherical structuring was excluded from such simple treatment. Yet I have found in tensegrity the key to a new uniformity in the erection of spherical structures which opens the door to the practical construction of spheres and spherical domes of virtually unlimited size without prohibitive complexity of componentation.

As the size of the structure and the number of identical components increase, central angles of the sphere subtended by individual components and the lengths of the chords represented by each component are so reduced in relation to the size of the sphere that the arc altitudes of the tension slings become negligible. The tension filled gap between adjacent booms then becomes virtually invisible and the booms seem deceptively to be arrayed in continuous compression contact. Yet they are not in such continuous compression contact and therefore are not subject to the circumferential shear stresses characteristic of more conventional compression systems. Instead, through the interaction of the tension slings, each boom is pulled radially inwardly in tensional coherence. In such high frequency arrays the tension slings of the booms can advantageously be constituted by integral flanges or fins on the booms as in FIG. 16, wherefore the discontinuous tensional nature of the structure becomes invisible and may only be apprehended upon analysis of the progressive stages of tensegrity from the tepee through the three-strut octahedral system as described with reference to FIGS. 1–3.

The terms and expressions which I have employed are used in a descriptive and not a limiting sense, and I have no intention of excluding such equivalents of the invention described as fall within the scope of the claims.

I claim:

1. A structure comprising a plurality of column-like members and a plurality of tension elements, the column-like members being held in axially spaced relationship to one another by the tension elements arranged as follows: each end of each column-like member is connected by tension elements both to an end portion and to a portion intermediate the ends of an adjacent column-like member.

2. A structure according to claim 1 in which that part of a column-like member which lies to one side of its central portion forms a triangular arrangement with two adjacent column-like members, and that part which lies to the other side of said central portion forms a triangular arrangement with another two adjacent column-like members, said two triangular arrangements overlapping one another.

3. A structure according to claim 1 in which that part of a column-like member which lies to one side of its central portion forms a triangular arrangement with two adjacent column-like members, and that part which lies to the other side of said central portion forms a triangular arrangement with another two adjacent column-like members, said two triangular arrangements being spaced from one another.

4. A structure according to claim 1 in which said column-like members are comprised by struts and said tension elements are comprised by cable means.

5. A structure according to claim 1 in which said column-like members are comprised by the bases of trough-shaped members and said tension elements are comprised by the edges of said trough-shaped members.

6. A structure according to claim 1 in which said column-like members comprise an assemblage of compression and tension components with compression components held in spaced relationship by the tension components.

7. In a discontinuous compression structure, a component comprising a strut and a pair of flexible tension slings each connected to an end portion and to a portion intermediate the ends of the strut, and means for connecting said slings respectively to end portions of two other components of like construction.

References Cited in the file of this patent

UNITED STATES PATENTS

| | | |
|---|---|---|
| 811,003 | Tudor | Jan. 30, 1906 |
| 2,637,421 | Wolfard | May 5, 1953 |
| 2,682,235 | Fuller | June 29, 1954 |
| 2,730,211 | Findlay | Jan. 10, 1956 |
| 2,822,068 | Hendrix | Feb. 4, 1958 |

OTHER REFERENCES

The Dymaxion World of Buckminster Fuller by Robert W. Marks; Reinhold Publishing Corporation; pages 156–163.